(12) United States Patent
Hou et al.

(10) Patent No.: US 8,315,482 B2
(45) Date of Patent: Nov. 20, 2012

(54) INTEGRATED PLATFORM FOR USER INPUT OF DIGITAL INK

(75) Inventors: Xiaohui Hou, Beijing (CN); Yingjun Qiu, Beijing (CN); Dongmei Zhang, Redmond, WA (US); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1176 days.

(21) Appl. No.: 11/821,870

(22) Filed: Jun. 26, 2007

(65) Prior Publication Data

US 2009/0002392 A1   Jan. 1, 2009

(51) Int. Cl.
 *G06K 9/54* (2006.01)
(52) U.S. Cl. ........ 382/305; 382/185; 382/186; 382/187; 382/290; 382/101
(58) Field of Classification Search ............... 382/305, 382/185–187, 290, 101
See application file for complete search history.

(56) References Cited

U.S. PATENT DOCUMENTS

| | | | |
|---|---|---|---|
| 5,445,901 A | | 8/1995 | Korall et al. |
| 5,500,937 A | | 3/1996 | Thompson-Rohrlich |
| 5,613,019 A | | 3/1997 | Altman et al. |
| 5,666,438 A | | 9/1997 | Beernink et al. |
| 5,680,480 A | * | 10/1997 | Beernink et al. ............. 382/187 |
| 5,687,254 A | | 11/1997 | Poon et al. |
| 5,742,705 A | | 4/1998 | Parthasarathy |
| 5,781,663 A | * | 7/1998 | Sakaguchi et al. ............. 382/189 |
| 5,784,504 A | | 7/1998 | Anderson et al. |
| 5,796,867 A | | 8/1998 | Chen et al. |
| 5,832,474 A | | 11/1998 | Lopresti |
| 5,963,942 A | * | 10/1999 | Igata ........................... 1/1 |
| 6,157,905 A | * | 12/2000 | Powell ......................... 704/2 |
| 6,173,253 B1 | | 1/2001 | Abe et al. |
| 6,240,424 B1 | | 5/2001 | Hirata |
| 6,263,113 B1 | | 7/2001 | Abdel-Mottaleb |
| 6,333,995 B1 | | 12/2001 | Perrone |
| 6,389,435 B1 | | 5/2002 | Golovchinsky |
| 6,415,256 B1 | | 7/2002 | Ditzik |
| 6,470,336 B1 | * | 10/2002 | Matsukawa et al. .......... 1/1 |

(Continued)

FOREIGN PATENT DOCUMENTS

JP     62284417 A  * 12/1987

(Continued)

OTHER PUBLICATIONS

Shape-searching—effort, Mar. 13, 2007,http://www.engineerlive.com/features/17264/shapesearching, pp. 1-3.*

(Continued)

*Primary Examiner* — Jayesh A Patel

(57) ABSTRACT

Described is a technology that provides an integrated platform for users to use different kinds of digital ink (e.g., handwritten characters, sketched shapes, handwritten formulas) when interacting with computer programs. The platform interprets the user's digital ink input and outputs one or more associated items into an application program. The output items can be customized for different application programs. In one aspect, the platform includes an ink panel having different operating modes for receiving digital ink, and a recognition service that recognizes different types of digital ink. The recognition service may include a unified recognizer that recognizes different types of digital ink, e.g., characters and shapes. Another recognizer may be included such as an equation recognizer. If the recognition result is text while in a non-text mode, the text may be used in a keyword search to locate items; otherwise, the recognition result may be used without keyword searching.

18 Claims, 12 Drawing Sheets

U.S. PATENT DOCUMENTS

| | | | |
|---|---|---|---|
| 6,512,995 | B2 | 1/2003 | Murao |
| 6,549,675 | B2 | 4/2003 | Chatterjee |
| 6,552,719 | B2 * | 4/2003 | Lui et al. ................. 345/179 |
| 6,625,335 | B1 | 9/2003 | Kanai |
| 6,681,044 | B1 | 1/2004 | Ma et al. |
| 6,813,395 | B1 | 11/2004 | Kinjo |
| 6,819,315 | B2 * | 11/2004 | Toepke et al. ............ 345/173 |
| 6,873,986 | B2 * | 3/2005 | McConnell et al. ............ 1/1 |
| 6,965,384 | B2 | 11/2005 | Lui et al. |
| 7,031,555 | B2 | 4/2006 | Troyanker |
| 7,050,632 | B2 | 5/2006 | Shilman et al. |
| 7,123,770 | B2 | 10/2006 | Raghupathy et al. |
| 7,136,082 | B2 | 11/2006 | Saund et al. |
| 7,167,585 | B2 | 1/2007 | Gounares et al. |
| 7,171,060 | B2 | 1/2007 | Park |
| 7,218,779 | B2 * | 5/2007 | Dodge et al. ................ 382/177 |
| 7,302,099 | B2 | 11/2007 | Zhang et al. |
| 7,324,691 | B2 * | 1/2008 | Li et al. ...................... 382/181 |
| 7,369,702 | B2 | 5/2008 | Abdulkader et al. |
| 7,526,129 | B2 | 4/2009 | Bargeron |
| 7,630,554 | B2 | 12/2009 | Napper et al. |
| 7,756,755 | B2 | 7/2010 | Ghosh et al. |
| 2002/0087426 | A1 | 7/2002 | Shiitani et al. |
| 2002/0090148 | A1 * | 7/2002 | Pass et al. ................... 382/305 |
| 2002/0149630 | A1 * | 10/2002 | Kitainik et al. ............. 345/863 |
| 2002/0150297 | A1 | 10/2002 | Gorbatov et al. |
| 2003/0007683 | A1 * | 1/2003 | Wang et al. ................. 382/159 |
| 2003/0086627 | A1 * | 5/2003 | Berriss et al. ............... 382/305 |
| 2003/0123733 | A1 | 7/2003 | Keskar et al. |
| 2003/0167274 | A1 | 9/2003 | Dettinger et al. |
| 2003/0215142 | A1 * | 11/2003 | Gounares et al. ........... 382/190 |
| 2003/0215145 | A1 * | 11/2003 | Shilman et al. ............. 382/195 |
| 2004/0017946 | A1 | 1/2004 | Longe et al. |
| 2004/0073572 | A1 | 4/2004 | Jiang |
| 2004/0252888 | A1 | 12/2004 | Bargeron et al. |
| 2005/0060324 | A1 | 3/2005 | Johnson et al. |
| 2005/0091576 | A1 | 4/2005 | Relyea et al. |
| 2005/0100214 | A1 | 5/2005 | Zhang et al. |
| 2005/0102620 | A1 * | 5/2005 | Seto et al. .................... 715/541 |
| 2005/0201620 | A1 | 9/2005 | Kanamoto et al. |
| 2005/0222848 | A1 | 10/2005 | Napper et al. |
| 2005/0281467 | A1 | 12/2005 | Stahovich |
| 2006/0001667 | A1 * | 1/2006 | LaViola et al. ............. 345/473 |
| 2006/0004728 | A1 * | 1/2006 | Gotoh .............................. 707/3 |
| 2006/0007188 | A1 | 1/2006 | Reiner |
| 2006/0031755 | A1 | 2/2006 | Kashi |
| 2006/0036577 | A1 | 2/2006 | Knighton |
| 2006/0045337 | A1 | 3/2006 | Shilman et al. |
| 2006/0050969 | A1 | 3/2006 | Shilman et al. |
| 2006/0062461 | A1 | 3/2006 | Longe et al. |
| 2006/0110040 | A1 | 5/2006 | Simard et al. |
| 2006/0126936 | A1 | 6/2006 | Bhaskarabhatla |
| 2006/0149549 | A1 * | 7/2006 | Napper ........................ 704/257 |
| 2006/0197763 | A1 | 9/2006 | Harrison |
| 2006/0209040 | A1 | 9/2006 | Garside et al. |
| 2006/0274943 | A1 * | 12/2006 | Abdulkader et al. ......... 382/186 |
| 2006/0277159 | A1 | 12/2006 | Napper et al. |
| 2006/0279559 | A1 * | 12/2006 | Kongqiao et al. ............. 345/179 |
| 2006/0290656 | A1 * | 12/2006 | Soong et al. .................. 345/156 |
| 2007/0003142 | A1 | 1/2007 | Simard et al. |
| 2009/0003658 | A1 | 1/2009 | Zhang et al. |
| 2009/0003703 | A1 | 1/2009 | Zhang et al. |
| 2009/0007272 | A1 | 1/2009 | Huang et al. |

FOREIGN PATENT DOCUMENTS

| | | |
|---|---|---|
| KR | 10-1993-0001471 B1 | 2/1993 |
| WO | WO03/034276 | 4/2003 |
| WO | WO 03034276 A1 * | 4/2003 |

OTHER PUBLICATIONS

Kevin Durdle, "Supporting Mathematical Handwriting Recognition through an Extended Digital Ink Framework", Date: 2003.

Saund, et al., "A Perceptually-Supported Sketch Editor", Proceedings of the 7th annual ACM symposium on User interface software and technology, ACM Press, New York, USA, Date: 1994, pp. 175-184.

Wu Xiaojie, "Achieving Interoperability of Pen Computing with Heterogenous Devices and Digital Ink Formats", Date: Dec. 2004.

International Search Report and Written Opinion Received for PCT Application No. PCT/US2008/068252, mailed on Dec. 31, 2008, 9 pages.

International Search Report and Written Opinion Received for PCT Application No. PCT/US2008/068251, mailed on Nov. 28, 2008, 11 pages.

"Shape-searching software helps to avoid wasted design effort", Date: Jun. 21, 2007, http://www.engineerlive.com/features/17264/shapesearching-softwarehelps-to-avoid-wasted-design-effort.thtml.

Behiels, G. et al., "Statistical shape model-based segmentation of digital X-ray images", Date: 2000, pp. 61-68.

Tang, et al., "Face photo recognition using sketch", Date: 2002, vol. 1, pp. I-257-I-260.

"CalliGrapher® 8.4 User's Guide"; 1997; pp. 1-127; PhatWare Corp.

"The Evolution of Tablet PC Technologies in Microsoft Windows Vista"; 2005; pp. 1-4.

Hse, et al.; "Recognition and Beautification of Multi-Stroke Symbols in Digital Ink"; 2002; pp. 1-7; American Association for Artificial Intelligence.

* cited by examiner

INTEGRATED PLATFORM FOR USER INPUT OF DIGITAL INK

CROSS-REFERENCE TO RELATED APPLICATIONS

The present application is related to the following copending U.S. patent applications, assigned to the assignee of the present application, filed concurrently herewith and hereby incorporated by reference: "Digital Ink-Based Search," U.S. patent application Ser. No. 11/821,837, and "Unified Digital Ink Recognition," U.S. patent application Ser. No. 11/821,858.

BACKGROUND

Digital ink is becoming an important media for users to interact with computer applications. For example, with a tablet personal computer, a user can use a pen to handwrite digital ink to input information.

While tablet PC and digital ink technologies thus make a user's utilization of computer much more natural, a user has to consider what type of information is going to be input at any given time, and then what program to use. For example, some programs are not digital ink aware, whereby digital ink cannot be input directly to that program. For such non-aware programs, a tablet PC input panel (TIP) may be used to convert handwriting to recognized text that is then input to the program as if it was typed on the keyboard.

However, at various times a user may want to input different kinds of information, such as characters (text), a shape, a sketch, a math equation, and so forth, but a tablet PC input panel can only provide text recognized from handwriting. Thus, the user needs to run a different and appropriate digital ink-aware program anytime a different type of digital ink is input, otherwise, for example, using the TIP will cause the system to attempt to convert the input to text.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a platform processes different types of digital ink input for sending corresponding information to different application programs. The platform includes an ink panel having different operating modes for receiving different types of digital ink, and a recognition service that recognizes different types of digital ink. A mechanism such as an API set couples the ink panel to the recognition service such that a recognition result (or information corresponding to the recognition result) may be provided to an application program.

In one example aspect, the recognition service includes a unified recognizer that recognizes at least two different types of digital ink input, e.g., characters and shapes. Another recognizer may be included in the recognition service, e.g., an equation recognizer; if so, a recognizer is selected for recognizing ink based upon a current operating mode of the ink panel.

In one example aspect, while in a non-text input mode such as a shape mode, the panel sends the ink input to a unified recognizer that recognizes both text and non-text items, e.g., shapes. If the recognition result corresponds to text and the input panel was in a non-text input mode when the recognized ink was received, the text is used in a keyword search to locate a non-character item for output. Otherwise, the recognition result is used for output without keyword searching.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
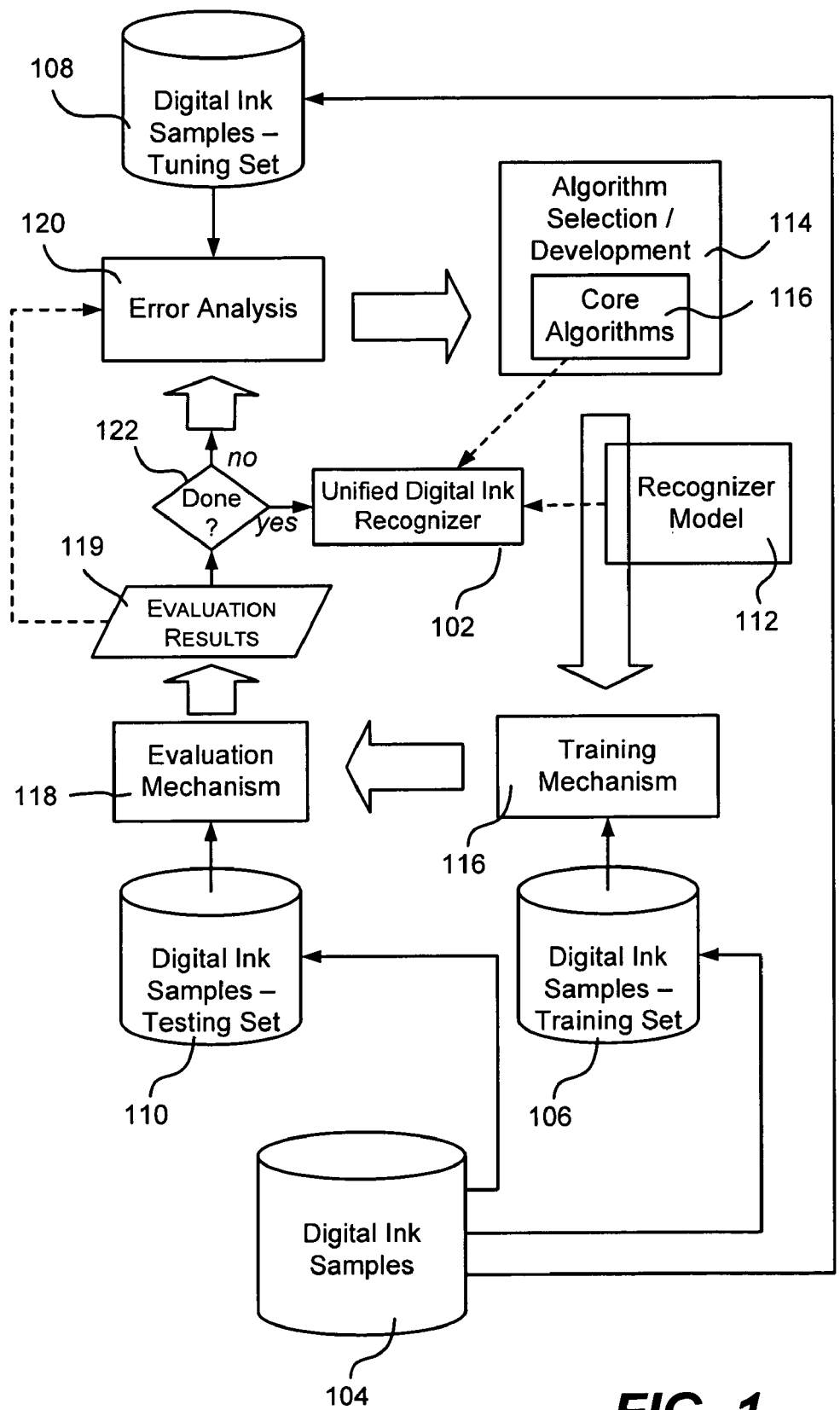
FIG. 1 is a block diagram representative of example components used to build a unified digital ink recognizer.

Various aspects of the technology described herein are generally directed towards digital ink based input technology that can be used to input items such as characters, shapes, sketches, formulas and so forth efficiently and naturally. In one aspect, digital ink is used as input to integrated smart digital ink panel, which can output appropriate corresponding data to any program that can receive digital ink and/or recognized output from a recognizer. For example, as is known, digital ink is input naturally by user's handwriting, and can be used to represent different kinds of information intuitively and effectively. As will be understood, the advantages of digital ink handwritten input are leveraged herein, whereby a user may input several kinds of information, such as text, shapes and math equations, for output into prevalent applications naturally and efficiently at the same time.

In one aspect, the smart digital ink panel provides a user with an integrated experience to input data to a computer by handwriting for use by any application that can consume corresponding information. For example, a user can input text (such as recognized from Chinese characters) into applications containing text editing functionality, such as a note taker program (e.g., Microsoft® Notepad), a word processing application (e.g., Microsoft® Word); a user can additionally input math equations via the panel into a suitable word processing application, (e.g., Microsoft® Word); and shapes into a diagramming program (Microsoft® Visio®).

While various examples herein are primarily directed to differentiating between characters, equations and shapes, any handwritten input may be differentiated and/or benefit from the technology described herein, including handwritten characters, sketched shapes, handwritten gestures, handwritten formulas (e.g., mathematical, chemical and so forth) and/or drawn pictures or the like. Further, while an example implementation of a unified digital ink recognizer is described herein that can among other aspects differentiate between characters and shapes, other implementations of a unified digital ink recognizer may be used.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, and digital ink in general.

Example Unified Digital Ink Recognizer

As described below with reference to FIGS. 1-4, a unified digital ink recognizer 102 is built. As part of the building process, a dataset of items that are to be recognized by the recognizer 102 is defined. For example, one such dataset comprises a set of Chinese characters and shapes, and contains 9,119 Chinese characters, corresponding to the Unicode range from 0x4e00 to 0x9FA5 (seldom used characters are removed), along with other custom shapes, corresponding to FIGS. 5-14, respectively. Further example shapes that may be recognized are represented in the aforementioned U.S. patent application entitled "Unified Digital Ink Recognition."

For the shape set, the private use area of Unicode that can be customized, ranging from Unicode 0xF000 to 0xF0FF, is used. For building a unified digital ink recognizer, any item to be recognized can be assigned with a Unicode value from the private use area of Unicode, although an item with an already-assigned Unicode values (e.g., a character) can use that value.

To build the unified digital ink recognizer 102, a learning based pattern recognition approach is used, as generally represented by the example components shown in FIG. 1. In general, this approach builds a classifier according to the features of different classes of items to be recognized. Via feature extraction, the features of each class of items are extracted from a collection of samples for that class.

With the classifier, given a new item to be recognized, the features of the item are matched with the feature of an existing class, which means the new item is recognized as belonging to that class.

One aspect of building a digital ink recognizer 102 with this approach is data collection of digital ink samples for each item in the defined dataset to be recognized by the digital ink recognizer 102. In the implementation represented in FIG. 1, the digital ink samples 102 are divided into three different datasets, comprising a training set 106, a testing set 110 and a tuning set 108. The training set 106 is used for building a recognizer model 112, the testing set 110 for evaluating the recognizer model 112, and the tuning set 108 for tuning the recognizer model 112 to improve its accuracy. In one example implementation, for building the recognizer model 112, five-hundred digital ink samples of handwriting were collected for each Chinese character in the training set, and one-hundred digital ink sketch samples were collected for each shape in the training set.

Based on the digital ink samples 104, a first mechanism (process step) 114 develops and/or selects a set of one or more core algorithms 116 for use in extracting the features of the training set 106 to build the digital ink recognizer model 112 according to the extracted features. The developed core algorithms are performed on the training set 106 to build the digital ink recognizer model 112.

Figure 2:
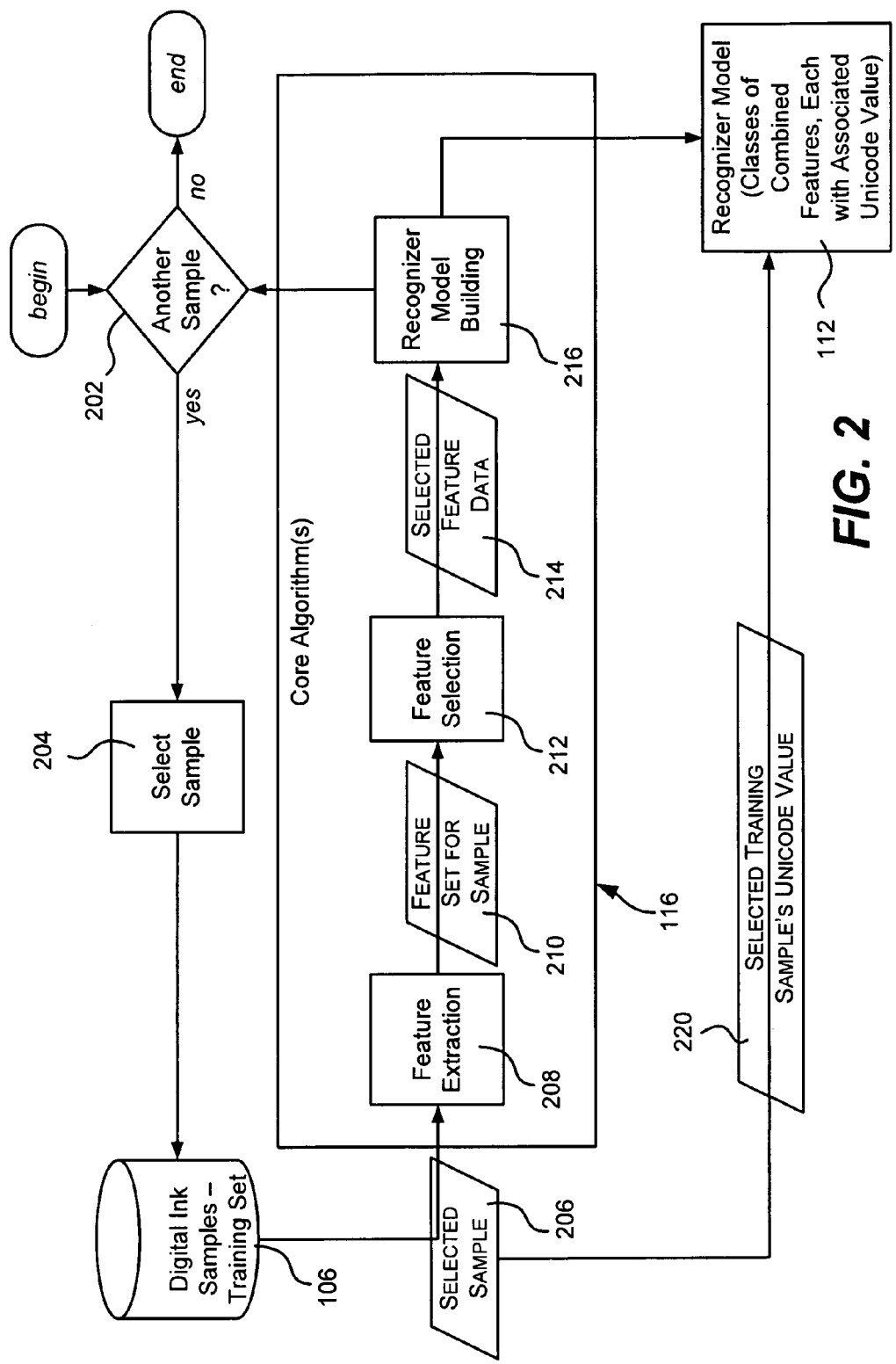
FIG. 2 is a block diagram representative of example components within a set of one or more core algorithms that may be used in building a unified digital ink recognizer.

More particularly, a recognition algorithm is used to build the recognizer model (classifier) 112 for the items to be recognized. As represented in FIG. 2 via blocks 202 and 204, for each selected training sample 206 of a set of training samples 106, the core algorithm 116 includes a feature extraction mechanism 208 that extracts a set of features 210. Further processing 212 may be performed on the feature set 210, such as feature selection (e.g., for nearest neighbor recognition, described below with reference to FIG. 3) into selected feature set 214. The feature set 214 is then combined with other such feature data for this sample's class to build (block 216) the recognizer model 112, by adjusting the combined feature data of the class to which this sample belongs based on the feature set 214.

As is known, there are many existing and possible recognition algorithms which may be used to build a recognition system, including nearest neighbor classification (sometimes referred to as k-nearest neighbor, or KNN), Gaussian Mixture Model (GMM), Hidden Markov Model (HMM), and so forth. In one implementation of the unified digital ink recognition system, nearest neighbor classification is used to recognize digital ink.

Figure 3A:
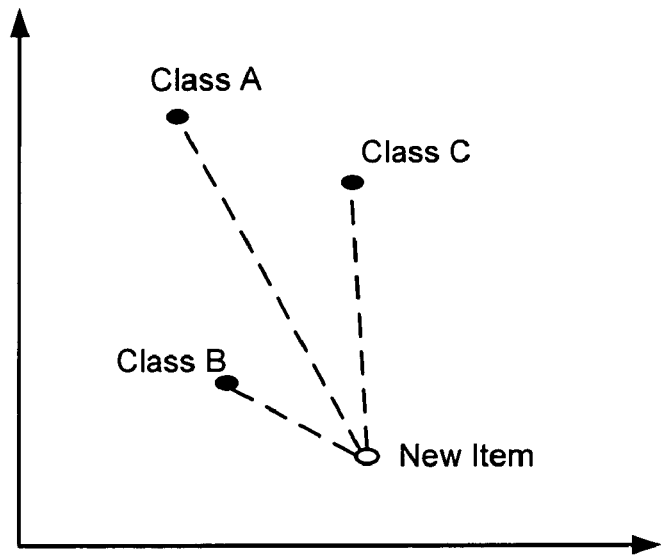
FIG. 3A is a visual representation of a core algorithm that recognizes a new item via nearness to a class within a recognition model built during training.

A primary concept in nearest neighbor classification is to use one point in multi-dimensional space to represent each class of samples, such as classes A-C as generally represented in FIG. 3A. In such an example, the class data is thus a set of coordinates in multiple (two or more) dimensional space.

Figure 3B:
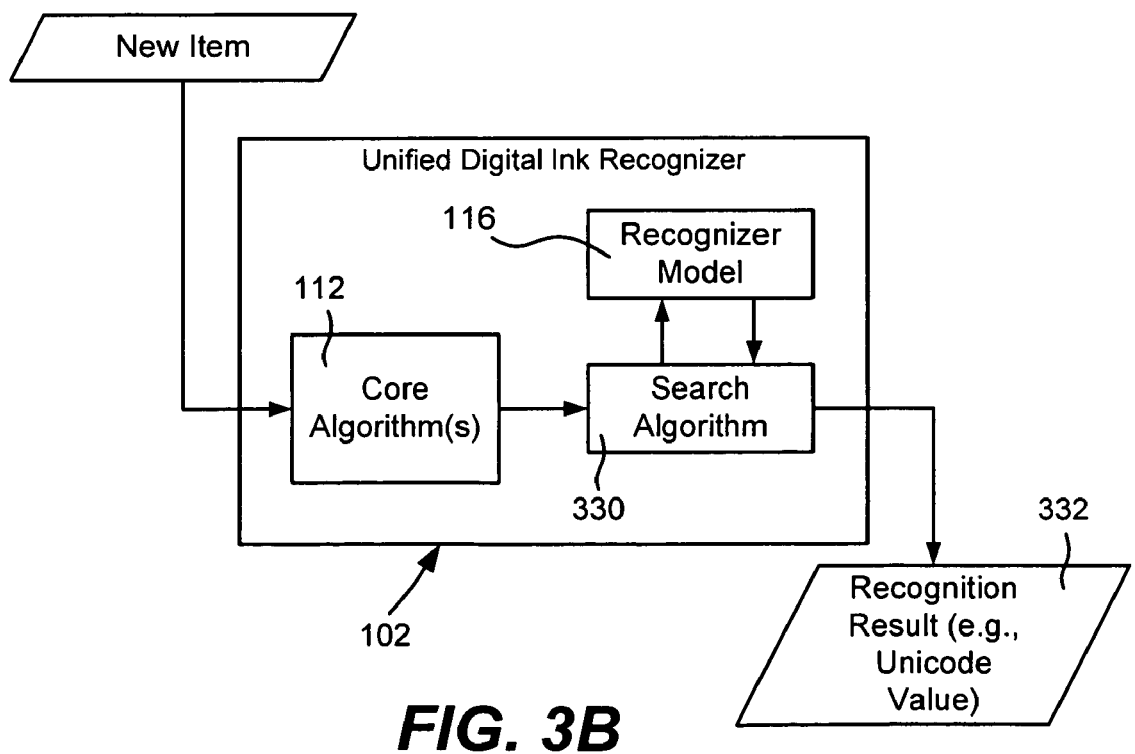
FIG. 3B is a block diagram representing recognition of a new item.

After the recognizer model 112 is built, when a new item "New Item" is to be recognized, that item is also represented by a point in this space. As represented in FIG. 3B, a search algorithm 330 performs computations (e.g., searches for a nearest neighbor) to find the nearest point relative to this new item's point, and recognizes this item as belonging to the class that is represented by the found search result, whereby the recognition result 332 (e.g., a Unicode value) is output. In the example of FIG. 3A, (in which only three classes are shown, and in only two dimensions for purposes of simplicity), it is readily apparent that the new item is nearest to the Class B, and thus would be recognized as whatever Unicode value corresponded to the Class B.

Returning to FIG. 1, the accuracy and efficiency of the unified digital ink recognizer model 112 may be evaluated via an evaluation mechanism 118 that operates using the testing set 116 of digital ink samples. Further, according to the evaluation results 119, some error analysis may be performed (block 120), by which the unified recognizer model 112 may be improved with the tuning set of digital ink samples 108. As represented via decision diamond 122, the process may be performed over and over to optimize the accuracy and efficiency of the unified recognizer model 112, until, for example, the evaluation results indicate an acceptable recognizer.

When complete, a unified digital ink recognizer 102 is provided, comprising the core algorithm or algorithms and the recognizer model 112. In one implementation, the unified digital ink recognizer can recognize digital ink of handwriting (e.g., Chinese characters) and sketching shapes (including sketched graphs). As a result, whether the user inputs a Chinese character by handwriting or inputs a shape by sketching, the unified digital ink recognizer correctly interprets the digital ink of the user's input as a character or as a shape.

Figure 4:
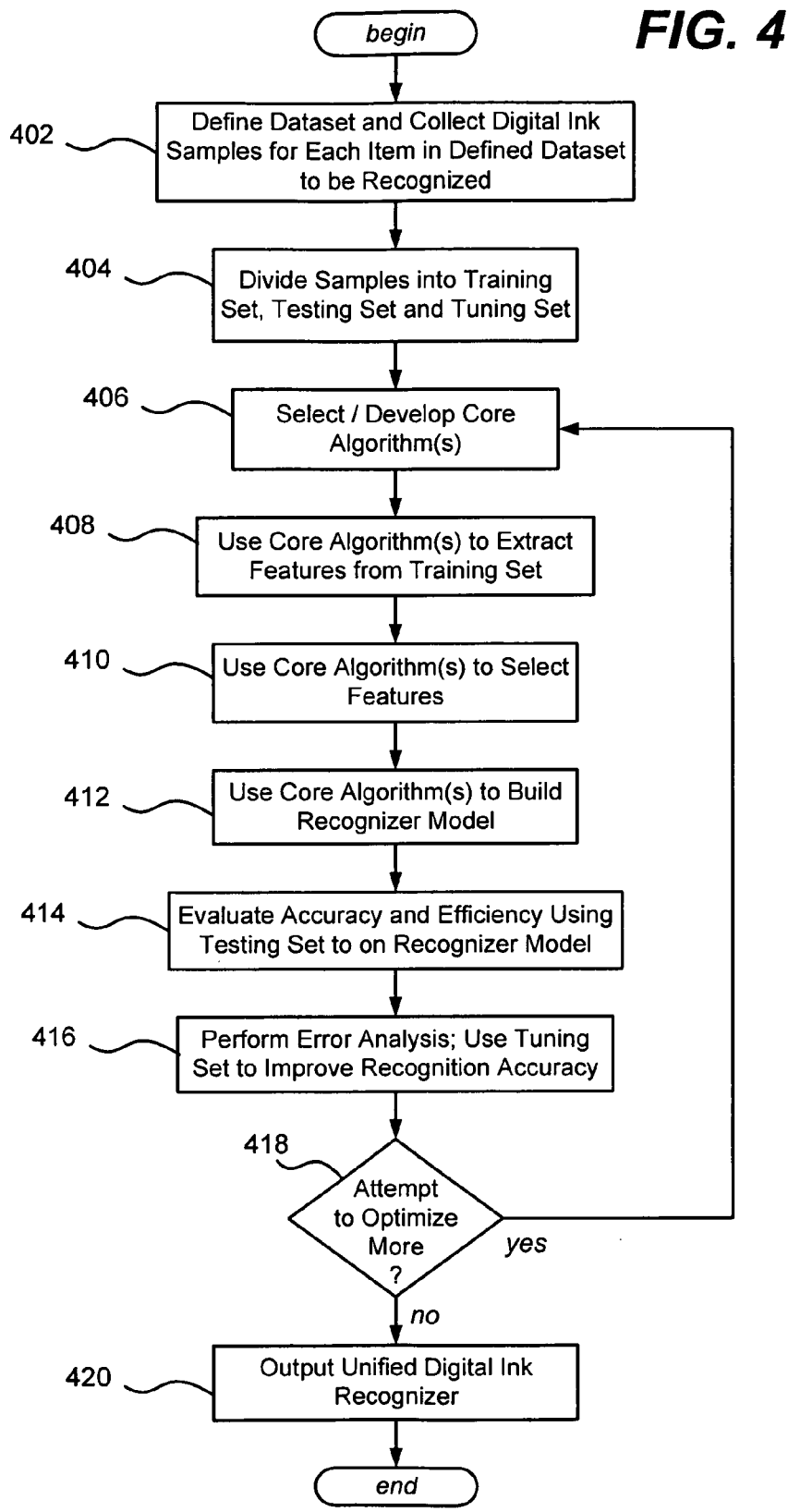
FIG. 4 is a flow diagram representing example steps that may be taken when building a unified digital ink recognizer.
Figure 5:
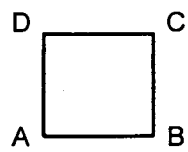
FIGS. 5-14 are representations of some example items that may be recognized from a sketch via a unified digital ink recognizer.
Figure 6:
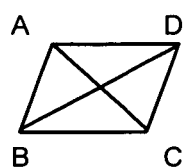
Figure 7:
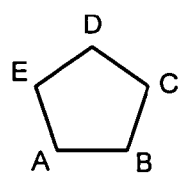
Figure 8:
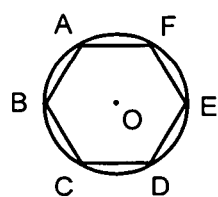
Figure 9:
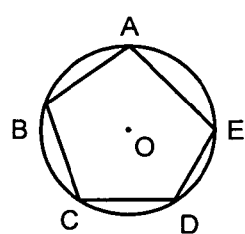
Figure 10:
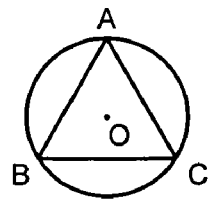
Figure 11:
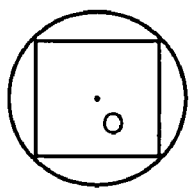
Figure 12:
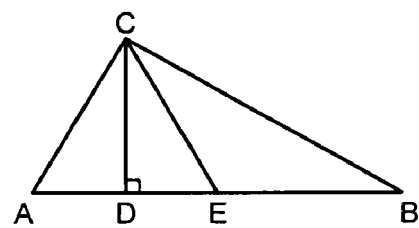
Figure 13:
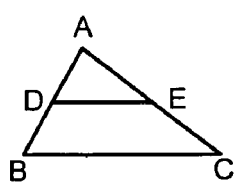
Figure 14:
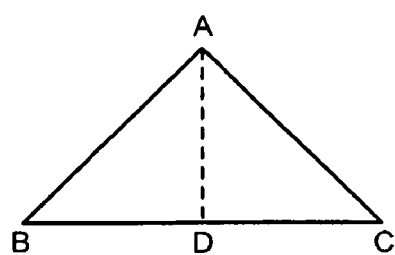

FIG. 4 summarizes how the unified digital ink recognition technology is built so as to uniformly recognize different kinds of information represented by digital ink, beginning at step 402 which represents defining the dataset of items to be recognized, and collecting the digital ink samples for those items. Step 404 represents dividing the digital ink samples into the training set, testing set and tuning set. Note that the samples may be divided randomly, or based on some other criteria, such as to put similar looking items in the tuning set. Step 406 represents selecting the core algorithms, e.g., determining which features to extract, and for nearest neighbor classification, which should be selected from those features, how much weight to give each feature, and so forth.

Step 408 represents using a feature extraction algorithm to extract the features from each selected item in the training set, with step 410 representing the feature selection algorithm, and step 412 representing the building of the recognizer model, e.g., processing the feature data of each selected item as needed to adjusting the feature data for the class [the class is identified by the Unicode value, the selected item is belonging to the class] in the recognizer model (such as representing multi-dimensional coordinates).

Step 414 represents the evaluation of the accuracy and/or efficiency using the testing set of digital ink samples. Based on an error analysis at step 416 as to how accurate and/or efficient the model is, samples from the tuning set may be applied at step 416 in an attempt to better optimize the recognizer. Step 418 represents repeating any or all of steps 406, 408, 410, 412, 414 and 416 for further optimization. Note that the evaluation at step 414 may be used to determine whether further optimization is necessary. Further, note that a model that is less accurate and/or efficient than another model may be discarded until the best model of those evaluated is determined.

Integrated Platform for User Input of Digital Ink

Figure 15:
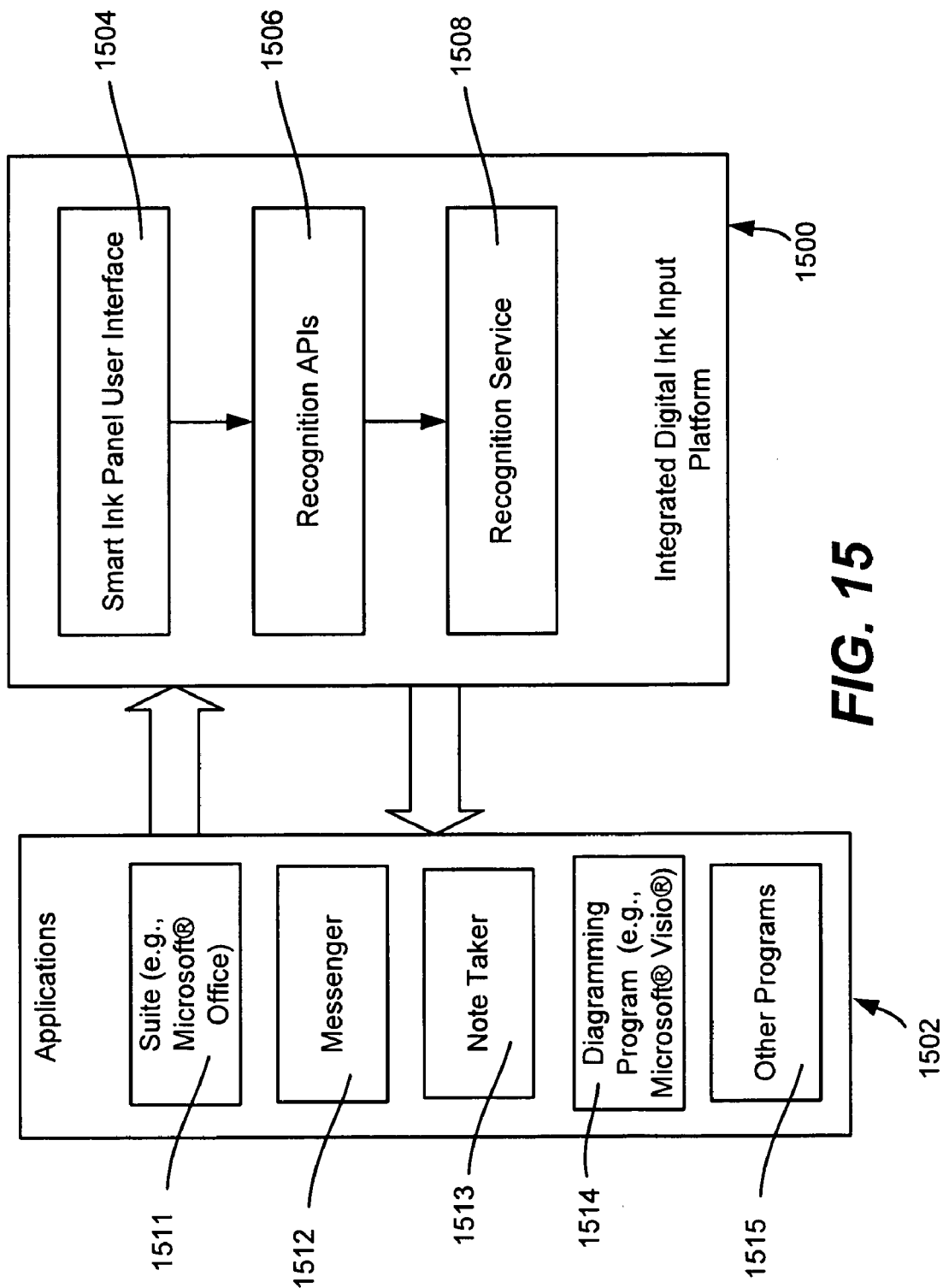
FIG. 15 is a block diagram representing example components of an integrated platform for user input of digital ink.

Turning to FIG. 15, there is exemplified an integrated platform 1500 by which a user may input different kinds of handwritten information, such as text, shapes and math equations for sending to application programs 1502. As will be understood, the integrated platform 1500 exhibits an integrated user experience of digital ink, and provides a user with a seamless experience to input different kinds of information into applications by handwriting.

Figure 16:
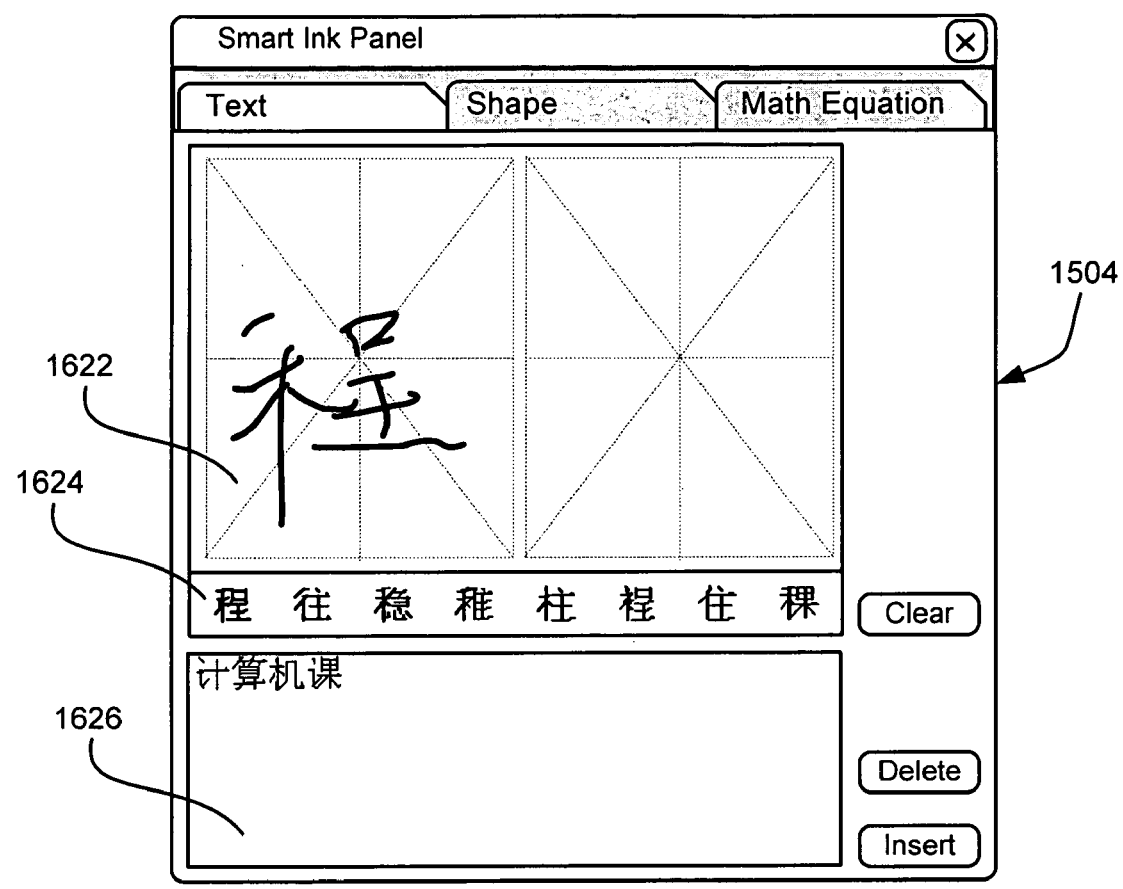
FIGS. 16-18 are representations of how different types of example digital ink may be input to an integrated platform.

As represented in FIG. 15, the platform 1500 includes a smart digital ink panel user interface (or more simply the "panel") 1504. In one implementation, the panel 1504 comprises a topmost application that does not get keyboard focus, whereby it can be used to input information to other applications 1502. The example panel 1504 operates in one of three different handwriting input modes, each of which implements a different input function, namely a Chinese text mode, a shape mode and a math equation mode. The Chinese text input mode is represented in FIG. 16, the shape input mode in FIG. 17 and the math equation input mode in FIG. 18. Other operating modes are feasible, e.g., text for other languages (including characters and/or words, symbols and gestures, printed and/or cursive), a drawing mode in which digital ink is passed to an application program without any recognition processing, a symbol input mode, a gesture input mode, a chemical equation input mode, a calculator mode, and/or virtually any type of mode in which handwritten input to an integrated user interface would be desirable.

In this example implantation, a set of recognition APIs 1506 are provided by which the panel 1504 communicates with a recognition engine service 1508. The recognition service 1508 may include the unified digital ink recognizer 102 of FIG. 1, and/or one or more other separate recognizers for each type of input. For example, characters and shapes may be recognized via the unified digital ink recognizer 102 of FIG. 1, while equations may be recognized by an equation recognizer. Alternatively, a handwritten character recognizer, a shape recognizer and an equation recognizer may be separate entities of the service 1508.

As the user inputs information to the panel 1504 by handwriting, the digital ink of the user's input is collected and is passed via the APIs 1506 to the recognition engine service 1508 for recognition. The recognition engine service 1508 returns a recognition result to the panel 1504. In different operating modes of the smart digital ink panel, the recognition result is different and is used differently for input.

More particularly, when operating in the text mode as illustrated by FIG. 16, when the user handwrites a Chinese character in an input area 1622 of the panel 1504, the ink is recognized, such as by the unified recognizer 102 (FIG. 1) that can recognize Chinese characters and shapes. The text of recognized Chinese characters may be displayed on an output area 1624 of the panel 1504, and then saved in output area 1626; for example, the recognized text displayed in the area 1624 may be saved in the area 1626 automatically after some time delay, or by a user's selecting from the list in the area 1624. Note that text in the area 1626 may be appended when further text is saved. Such text can be used as text input for a currently active (focused) application, such as when entered by a user. Alternatively, the text can be sent to the application directly, e.g., as soon as it is recognized or after a time delay that gives a user a chance to cancel sending the text, such as if an error occurred or the user wants to input a different character. Note that virtually any application can receive text as input when in an appropriate state, e.g., an instant messaging program 1512, a note taker 1513, a diagramming program such as Microsoft® Visio® 1514, a productivity suite program such as a Microsoft® Office application 1511, and other such programs 1515.

Figure 17:
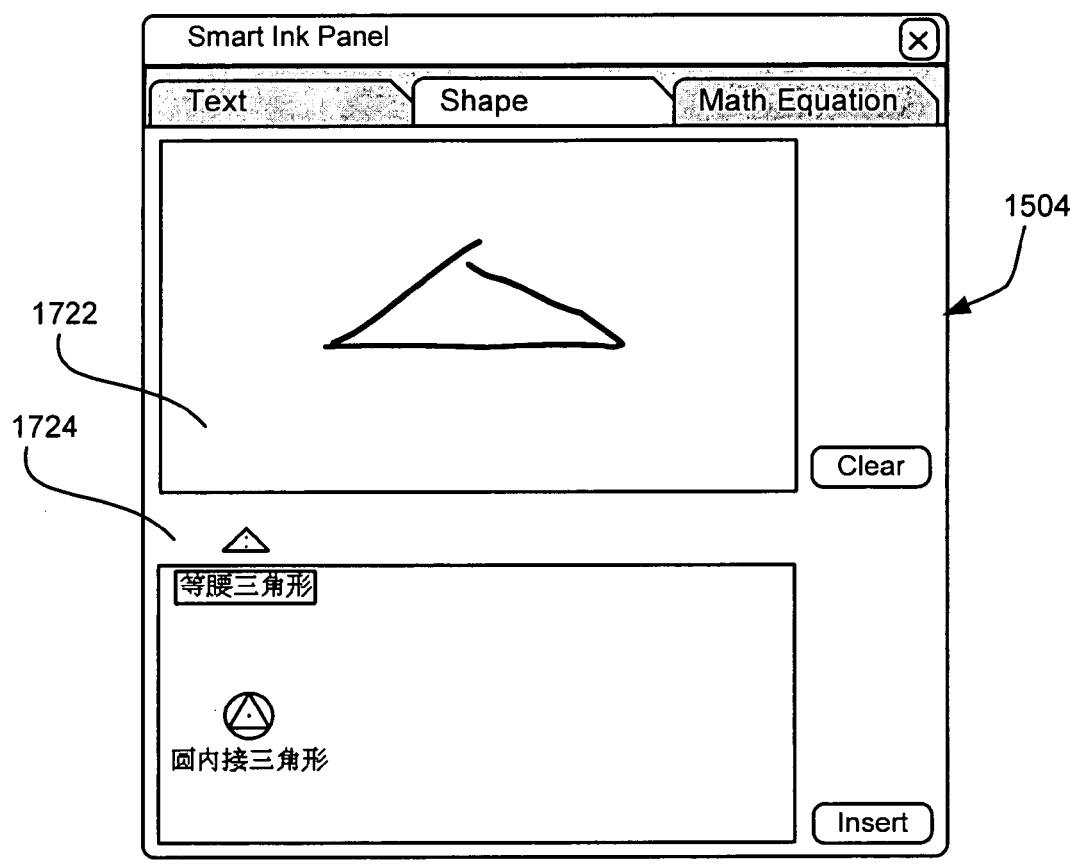

In the shape mode as illustrated in FIG. 17, a user may handwrite Chinese characters or sketch shapes (such as triangle, rectangle, circle, and so forth) in an input area 1722 of the panel 1504, which may be recognized by the unified recognizer 102 as described above. If so, the recognition result may be a Chinese character or a shape according to the user's input. As described in the aforementioned U.S. patent application entitled "Digital Ink-Based Search," if the recognition result is a Chinese character, then the character may be used as a keyword to search for related shapes. If a shape, the shape is returned without searching. A recognized shape or one or more shapes found via a search are displayed on an output area 1724 of the panel 1504, from where they can be inserted and/or dragged-and-dropped into an application that accepts information corresponding to shapes, e.g., Microsoft® Visio® or a Microsoft® Office application. Alternatively, if only one shape is recognized or returned in a search, the corresponding shape information (e.g., an identifier for Visio® shape) can be sent to the application directly.

Figure 18:
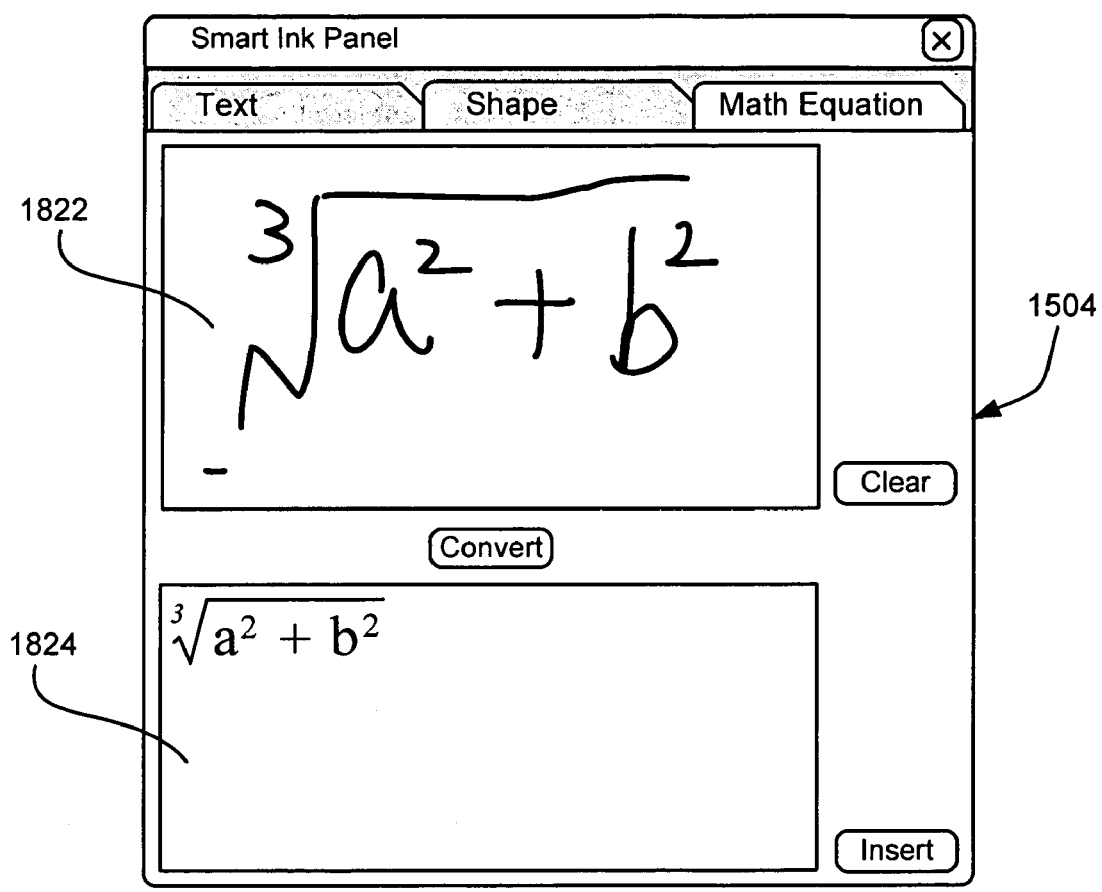

In the math equation mode which is illustrated in FIG. 18, when the user handwrites a math equation into an input area 1822 of the panel 1504 and completes it (e.g., via the "Convert" button), the equation is recognized by a math equation recognizer of the recognition service 1508. The recognized result may be displayed on an output area 1824 of the panel 1504, and may be used as input (e.g., via the "Insert" button) to a suitable application that accepts equations (e.g., Microsoft® Word).

Figure 19:
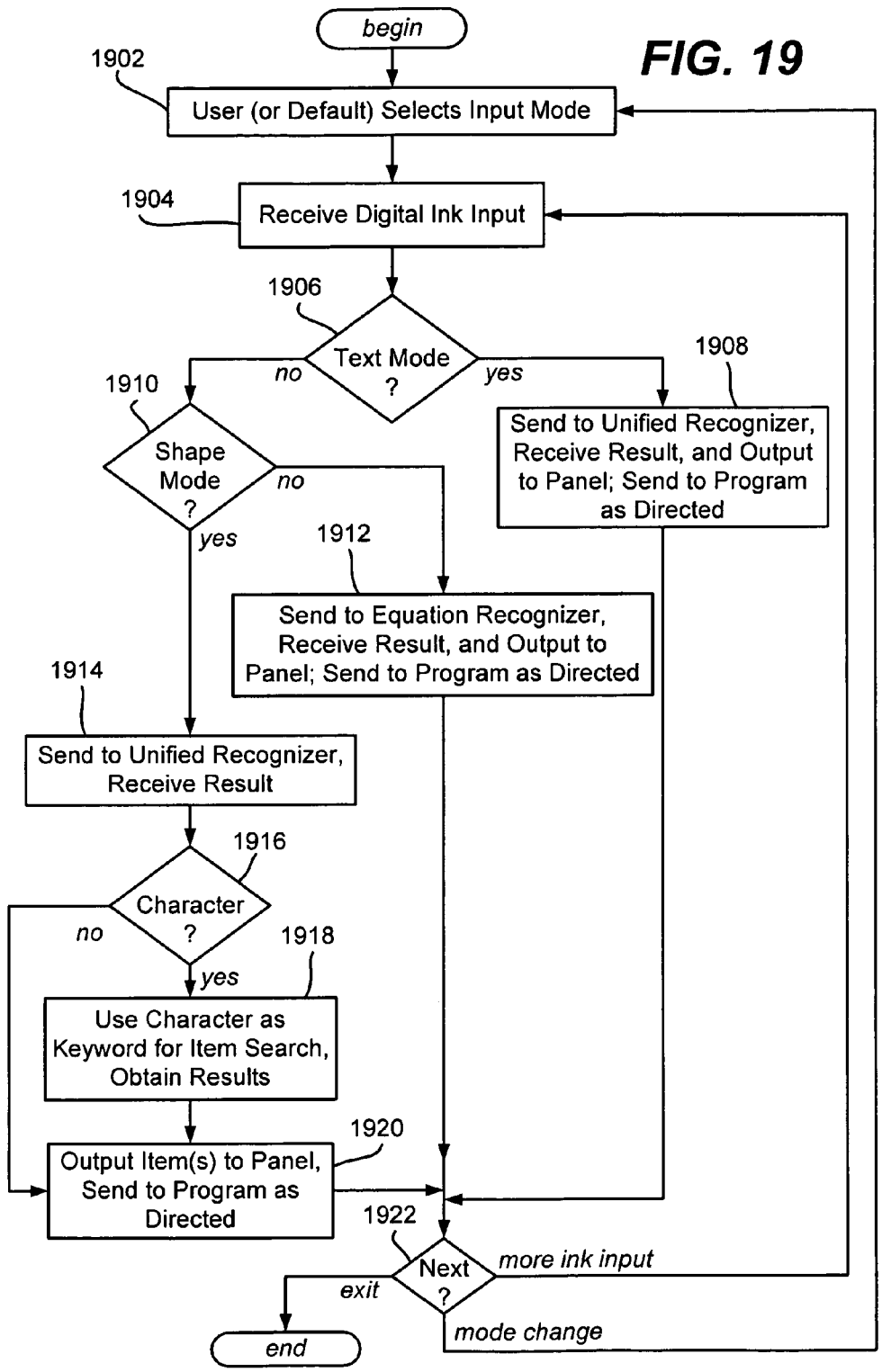
FIG. 19 is a flow diagram representing example logic for handling different types of digital ink at an integrated platform.

FIG. 19 provides example steps that may be taken by the panel 1504 to produce an item result set from handwritten input based on a recognition result. For purposes of brevity, FIG. 19 will describe text, shape and equation recognition, in which the text and shape input is recognized via the unified digital ink recognizer 102. Also for brevity, certain steps refer to outputting recognized items to the panel and/or sending information corresponding to the results to a program as directed, such as by a selection or drag-and-drop operation from the panel output area, which also includes the concept of the user choosing to not send information to the program.

Step 1902 represents selecting the input mode, e.g., text, shape or equation, which may be done by default upon opening the panel. Step 1904 represents receiving the digital ink input to recognize, which as described above may be a character or other, non-character item depending on the current mode.

Steps 1906 and 1910 represent routing the input to an appropriate recognizer, which in the text mode is the unified recognizer (step 1908) in this example, but may be a text-only recognizer or the like. Step 1908 represents the text mode, in which the input is sent to the unified recognizer, a recognition result received and output to the panel, and thereafter handled as directed by the user or other process, e.g., to send the text (e.g., one or more Unicode values) to the current program in focus or cancel the send.

If the not text mode, step 1910 determines whether the input is to be routed to a shape-enabled (e.g., unified) recognizer or the equation recognizer. If in the equation mode, step 1912 is executed, in which the input is sent to the equation recognizer, a recognition result received and output to the panel, and thereafter handled as directed by the user or other process, e.g., to send the equation (or corresponding equation information) to the current program in focus or cancel the send.

Steps 1914, 1916, 1918 and 1920 represent example actions taken when digital ink is received in the shape mode, beginning at step 1914 where the ink input is sent to the unified recognizer. In this example, if a shape was recognized, the shape is output to the user via step 1920. Step 1920 also represents handling the shape as directed by the user or other process, e.g., to send shape information to the current program in focus or cancel the send.

If instead a character was recognized while in the shape mode as described above, (step 1916), step 1916 branches to step 1918 where the character is used as a keyword (or to build a keyword) for searching a shape data store or the like. Step 1918 also represents searching and obtaining the search results, with step 1920 representing outputting the found item or items to the user, and thereafter handling the item or items as directed by the user or other process, e.g., to send shape information to the current program in focus or cancel the send.

Step 1922 represents handling the user's next action, which in this example is ending the panel, inputting more ink, or changing modes. In this manner, the smart digital ink panel thus provides an integrated user experience with digital ink input, via an integrated platform for inputting different kinds of information into application programs.

Exemplary Operating Environment

Figure 20:
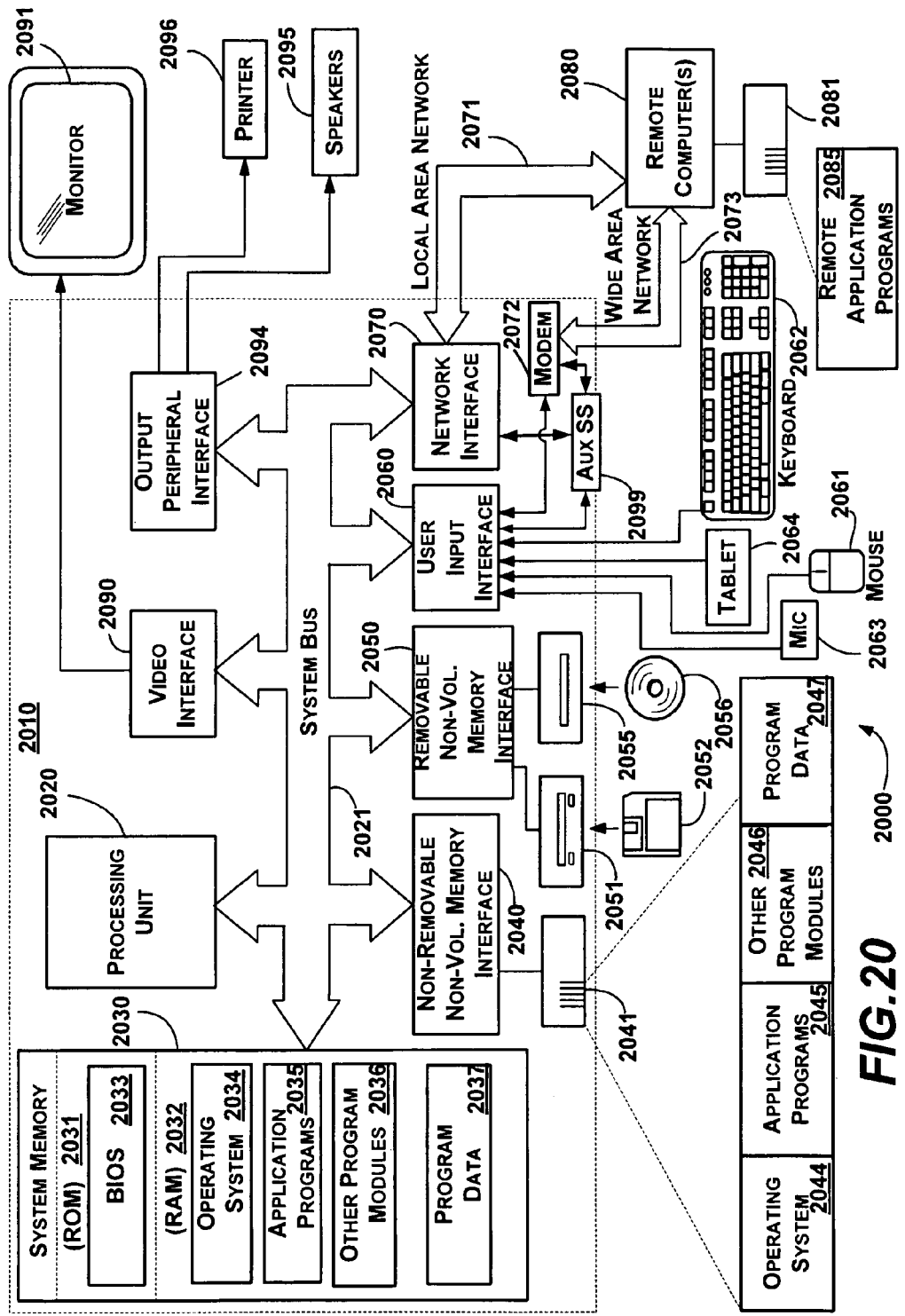
FIG. 20 shows an illustrative example of a general-purpose network computing environment into which various aspects of the present invention may be incorporated.

FIG. 20 illustrates an example of a suitable computing system environment 2000 on which the integrated platform of FIGS. 18 and 19 may be implemented. The computing system environment 2000 is only one example of a suitable computing environment and is not intended to suggest any limitation as to the scope of use or functionality of the invention. Neither should the computing environment 2000 be interpreted as having any dependency or requirement relating to any one or combination of components illustrated in the exemplary operating environment 2000.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 20, an exemplary system for implementing various aspects of the invention may include a general purpose computing device in the form of a computer 2010. Components of the computer 2010 may include, but are not limited to, a processing unit 2020, a system memory 2030, and a system bus 2021 that couples various system components including the system memory to the processing unit 2020. The system bus 2021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 2010 typically includes a variety of computer-readable media. Computer-readable media can be any available media that can be accessed by the computer 2010 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 2010. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 2030 includes computer storage media in the form of volatile and/or nonvolatile memory such as read only memory (ROM) 2031 and random access memory (RAM) 2032. A basic input/output system 2033 (BIOS), containing the basic routines that help to transfer information between elements within computer 2010, such as during start-up, is typically stored in ROM 2031. RAM 2032 typically contains data and/or program modules that are immediately accessible to and/or presently being operated on by processing unit 2020. By way of example, and not limitation, FIG. 20 illustrates operating system 2034, application programs 2035, other program modules 2036 and program data 2037.

The computer 2010 may also include other removable/non-removable, volatile/nonvolatile computer storage media. By way of example only, FIG. 20 illustrates a hard disk drive 2041 that reads from or writes to non-removable, nonvolatile magnetic media, a magnetic disk drive 2051 that reads from or writes to a removable, nonvolatile magnetic disk 2052, and an optical disk drive 2055 that reads from or writes to a removable, nonvolatile optical disk 2056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2041 is typically connected to the system bus 2021 through a non-removable memory interface such as interface 2040, and magnetic disk drive 2051 and optical disk drive 2055 are typically connected to the system bus 2021 by a removable memory interface, such as interface 2050.

The drives and their associated computer storage media, described above and illustrated in FIG. 20, provide storage of computer-readable instructions, data structures, program modules and other data for the computer 2010. In FIG. 20, for example, hard disk drive 2041 is illustrated as storing operating system 2044, application programs 2045, other program modules 2046 and program data 2047. Note that these components can either be the same as or different from operating system 2034, application programs 2035, other program modules 2036, and program data 2037. Operating system 2044, application programs 2045, other program modules 2046, and program data 2047 are given different numbers herein to illustrate that, at a minimum, they are different copies. A user may enter commands and information into the computer 2010 through input devices such as a tablet, or electronic digitizer, 2064, a microphone 2063, a keyboard 2062 and pointing device 2061, commonly referred to as mouse, trackball or touch pad. Other input devices not shown in FIG. 20 may include a joystick, game pad, satellite dish, scanner, or the like. These and other input devices are often connected to the processing unit 2020 through a user input interface 2060 that is coupled to the system bus, but may be connected by other interface and bus structures, such as a parallel port, game port or a universal serial bus (USB). A monitor 2091 or other type of display device is also connected to the system bus 2021 via an interface, such as a video interface 2090. The monitor 2091 may also be integrated with a touch-screen panel or the like. Note that the monitor and/or touch screen panel can be physically coupled to a housing in which the computing device 2010 is incorporated, such as in a tablet-type personal computer. In addition, computers such as the computing device 2010 may also include other peripheral output devices such as speakers 2095 and printer 2096, which may be connected through an output peripheral interface 2094 or the like.

The computer 2010 may operate in a networked environment using logical connections to one or more remote computers, such as a remote computer 2080. The remote computer 2080 may be a personal computer, a server, a router, a network PC, a peer device or other common network node, and typically includes many or all of the elements described above relative to the computer 2010, although only a memory storage device 2081 has been illustrated in FIG. 20. The logical connections depicted in FIG. 20 include one or more local area networks (LAN) 2071 and one or more wide area networks (WAN) 2073, but may also include other networks. Such networking environments are commonplace in offices, enterprise-wide computer networks, intranets and the Internet.

When used in a LAN networking environment, the computer 2010 is connected to the LAN 2071 through a network interface or adapter 2070. When used in a WAN networking environment, the computer 2010 typically includes a modem 2072 or other means for establishing communications over the WAN 2073, such as the Internet. The modem 2072, which may be internal or external, may be connected to the system bus 2021 via the user input interface 2060 or other appropriate mechanism. A wireless networking component 2074 such as comprising an interface and antenna may be coupled through a suitable device such as an access point or peer computer to a WAN or LAN. In a networked environment, program modules depicted relative to the computer 2010, or portions thereof, may be stored in the remote memory storage device. By way of example, and not limitation, FIG. 20 illustrates remote application programs 2085 as residing on memory device 2081. It may be appreciated that the network connections shown are exemplary and other means of establishing a communications link between the computers may be used.

An auxiliary subsystem 2099 (e.g., for auxiliary display of content) may be connected via the user interface 2060 to allow data such as program content, system status and event notifications to be provided to the user, even if the main portions of the computer system are in a low power state. The auxiliary subsystem 2099 may be connected to the modem 2072 and/or network interface 2070 to allow communication between these systems while the main processing unit 2020 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage device having computer-executable instructions which, when executed by a computing device, cause the computing device to perform:
receiving digital ink from a user as input to an input panel having user-selectable modes that implement different input functions, the user-selectable modes comprising at least a text input mode and a shape input mode that is different than the text input mode;
providing the digital ink to a recognition service that is capable of recognizing the digital ink;
receiving a recognition result from the recognition service, the recognition result comprising recognized text or a recognized non-textual shape;

in a first instance when the user has placed the input panel into the text input mode before the digital ink is received and the recognition result comprises the recognized text, providing the recognized text to a text processing application;

in a second instance when the user has placed the input panel into the shape input mode before the digital ink is received and the recognition result comprises the recognized non-textual shape, providing the recognized non-textual shape to a non-textual shape processing application that is different from the text processing application; and in a third instance when the user has placed the input panel into the shape input mode before the digital ink is received and the recognition result comprises the recognized text, providing the recognized text as a keyword to the non-textual shape processing application to use in a keyword search to locate another non-textual shape that is related to the keyword.

2. The computer-readable storage device of claim 1, further comprising instructions which, when executed by the computing device, cause the computing device to perform:

providing a visible representation of the recognized non-textual shape to an output area of a results panel.

3. The computer-readable storage device according to claim 1, further comprising instructions which, when executed by the computing device, cause the computing device to perform:

selecting an individual recognizer from a plurality of recognizers associated with the recognition service, a first one of the plurality of recognizers being selected when the input panel is in the text input mode and a second, different one of the plurality of recognizers being selected when the input panel is in an equation input mode.

4. A method comprising:

displaying an input panel having user-selectable modes, the user-selectable modes comprising at least a text input mode and a shape input mode, wherein:
- at least the text input mode and the shape input mode are displayed concurrently on the input panel, and
- the user selects from the user-selectable modes displayed on the input panel before entering digital ink to the input panel;

receiving the digital ink as input to the input panel after the user selects from the user-selectable modes displayed on the input panel;

providing the digital ink to a recognition service that recognizes the digital ink;

receiving a recognition result from the recognition service, the recognition result comprising recognized text or a recognized non-textual shape;

determining whether the user has selected the text input mode displayed on the input panel or the shape input mode displayed on the input panel;

in a first instance, responsive to determining that the user has selected the text input mode displayed on the input panel, providing the recognized text to a text processing application, wherein the recognized text corresponds to one or more handwritten characters entered by the user via the digital ink while the input panel is in the text input mode; and in a second instance, responsive to determining that the user has selected the shape input mode displayed on the input panel, providing the recognized non-textual shape to a non-textual shape processing application that is different from the text processing application, wherein the recognized non-textual shape corresponds to a sketched shape that is entered by the user via the digital ink while the input panel is in the shape input mode, and wherein at least the providing the recognized text to the text processing application and the providing the recognized non-textual shape to the non-textual shape processing application is performed by a computing device, and wherein, in the second instance, the recognition result comprises an individual value that is assigned to the recognized non-textual shape.

5. The method according to claim 4, the user-selectable modes displayed on the input panel further comprising an equation input mode.

6. The method according to claim 5, further comprising:

in a third instance when the user selects the equation input mode displayed on the input panel, providing a math equation recognized by the recognition service to the text processing application.

7. The method according to claim 4, further comprising assigning Unicode values to a plurality of non-textual shapes, the Unicode values including the individual value that is assigned to the recognized non-textual shape.

8. The method according to claim 4, wherein, in the second instance, the individual value is a Unicode value that is assigned to the recognized non-textual shape.

9. A system comprising:

a platform configured to:
- provide an input panel having user-selectable modes comprising at least a text input mode and a shape input mode, wherein a user selects from the user-selectable modes before entering digital ink to the input panel;
- receive the digital ink as input to the input panel after the user selects from the user-selectable modes;
- provide the digital ink to a recognition service that recognizes the digital ink;
- receive a recognition result from the recognition service, the recognition result comprising recognized text or a recognized non-textual shape;
- in a first instance when the user has placed the input panel into the text input mode before entering the digital ink and the recognition result comprises the recognized text, provide the recognized text to a text processing application;
- in a second instance when the user has placed the input panel into the shape input mode before entering the digital ink and the recognition result comprises the recognized non-textual shape, provide the recognized non-textual shape to a non-textual shape processing application that is different from the text processing application; and
- in a third instance when the user has placed the input panel into the shape input mode before the digital ink is received and the recognition result comprises the recognized text, provide the recognized text as a keyword to the non-textual shape processing application to use in a keyword search to locate another non-textual shape that is related to the keyword; and at least one processing device configured to execute the platform.

10. The system according to claim 9, wherein the input panel comprises a topmost application that does not receive focus.

11. The system according to claim 9, wherein, in the first instance, the text processing application receives focus and the input panel does not receive focus.

12. The system according to claim 9, wherein, in the second instance, the non-textual shape processing application receives focus and the input panel does not receive focus.

13. The system according to claim 9, wherein the platform is further configured to, in the first instance, delay providing the recognized text to the text processing application and, during the delay, allow the user to cancel providing the recognized text to the text processing application in event of an error.

14. The system according to claim 9, wherein, in the first instance, the recognized text comprises Chinese characters.

15. The system according to claim 9, wherein, in the third instance, the recognized text comprises one or more Chinese characters that are provided as the recognized text for the keyword search to locate the another non-textual shape that is related to the one or more Chinese characters.

16. The system according to claim 9, wherein the platform is further configured to display the another non-textual shape and allow the user to drag and drop the another non-textual shape into the non-textual shape processing application.

17. The system according to claim 9, wherein the text processing application and the non-textual shape processing application are different applications.

18. The system according to claim 9, wherein the platform is further configured to, in a fourth instance when the user has placed the input panel into an equation mode, provide the recognized non-textual shape to an equation recognizer that recognizes at least the following symbols from the digital ink entered by the user:

"$a^2$";
"$b^2$";
"+"; and
"$\sqrt[3]{}$."

* * * * *